Patented Nov. 26, 1929

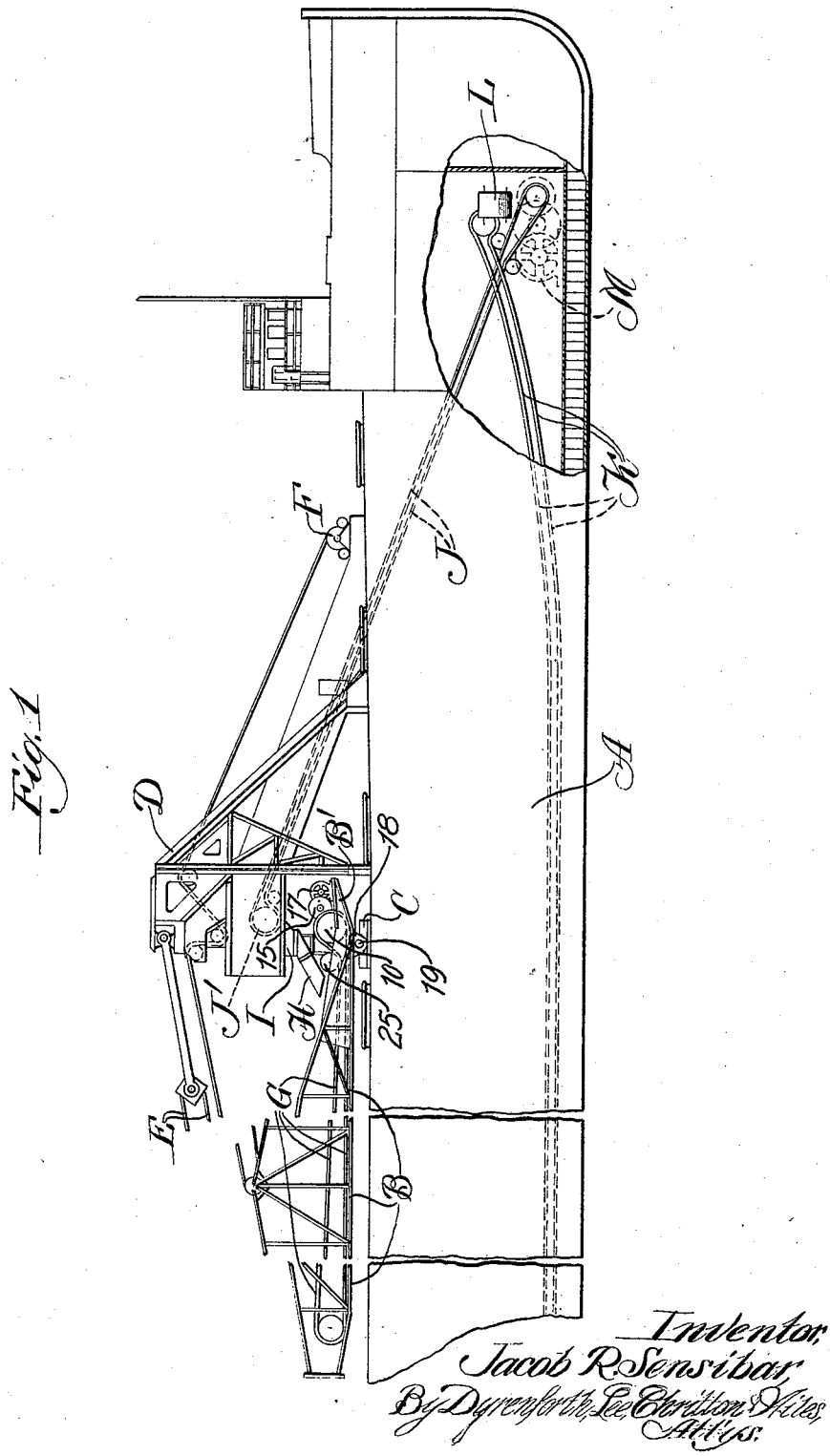

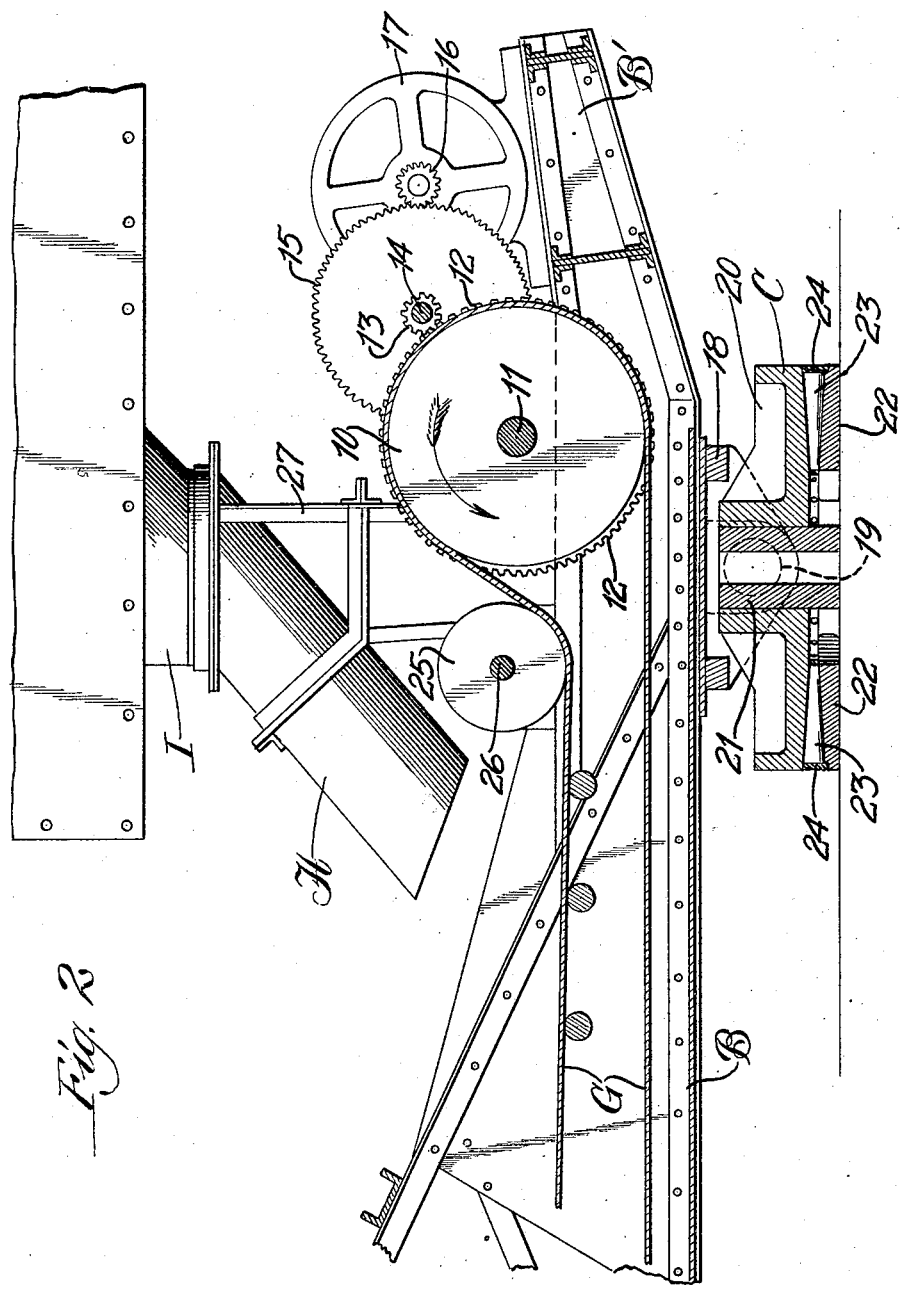

1,737,342

UNITED STATES PATENT OFFICE

JACOB R. SENSIBAR, OF CHICAGO, ILLINOIS

UNLOADING BOOM FOR SHIPS AND TURNTABLE THEREFOR

Application filed July 22, 1927. Serial No. 207,659.

This invention relates to unloading booms for ships and turntable therefor.

An object of the invention is to provide an unloading boom for ships which carries an endless belt conveyor in which the vertical space occupied by the boom and support is reduced to a minimum.

This, and other objects, as will hereinafter appear, are accomplished by this invention which is fully described in the following specification and shown in the accompanying drawings, in which—

Figure 1 is a partial side elevation of the fore end of a boat shown partly in section; and Fig. 2 is a partial side elevation and longitudinal vertical section of the pivot and support of the inner end of the boom.

The embodiment illustrated comprises a ship having a hull A on which is mounted a boom B which is supported at its inner end upon a turntable C, the outer end of the boom being carried by means of a support D and rope E which is wound upon a hoisting drum F. The boom B carries a belt conveyor G which has a separate drive on the tail end, as will hereinafter be described, and is fed by means of a suitable chute H from a hopper I to which the belt conveyor J delivers. This conveyor extends forwardly into the hold of the vessel and receives material from the longitudinal belt conveyor K which delivers by means of a chute L. The conveyor J is driven by means of a motor M, through a suitable train of reduction gears, motor and gearing being located in a separate room.

It is of prime importance that the support D be made as low as possible both for the sake of keeping down the total height of the vessel so that it can pass under low bridges and the like and, also, because any unnecessary weight in the support D renders the vessel unsteady in a rough sea.

The arrangement of the conveyor B with its turntable C, as will hereinafter appear, permits the hopper I to be placed very low. At the same time, the shifting of the driving motor M and its reduction gears to the tail end of the conveyor J further reduces the total height required at the end of the conveyor J with the result that it is possible to use the very much lower support D than engineers in general have heretofore considered possible.

Moreover, placing the motor M and its attendant gearing in a separate room enables the motor to be properly cooled, keeps it out of the dust which is usually present at the head end of the conveyor J during the unloading operation, and places it where it is also more accessible for inspection and repair.

Referring now to Figure 2, the belt conveyor G has a tail pulley 10 which is mounted on the shaft 11 which carries a gear 12 which meshes with a pinion 13 on the shaft 14. This shaft carries a gear 15 which meshes with a pinion 16 on the shaft of the motor 17. The shafts 11 and 14 are mounted in suitable bearings which, together with the motor 17, are bolted on the extension B' of the boom B. This boom is mounted at the inner end on trunnions 18 in which are journalled horizontally disposed pins 19 which are carried by the table 20 which, in turn, has a vertical bearing on the boss 21 which extends upwardly from the turntable bed plate 22. Anti-friction rollers 23 are placed between the bed plate 22 and table 20 and are held in place therein by means of a suitable retainer 24.

The upper strand of the conveyor belt G is depressed by means of an idler 25 which is carried by a shaft 26 suitably journalled on the boom B so as to further reduce the total height required by the hopper I. The chute H is made round at the top to fit the rounded lower end of the hopper I and is carried by means of a support 27 which is carried by the table 20, the axis of which is coincident with the hopper bottom I.

The inner end of the boom is relieved on its underside so as to permit the outer end of the boom to be raised.

Thus it will be seen that this arrangement of parts, particularly the method of mounting the boom and turntable on the deck of the boat, permits the chute I to be brought very close to the deck so that the head pulley J' of the conveyor J is brought very low, thereby permitting the height of the boom support D to be reduced very materially. This is further enhanced, as has been previously described, by locating the drive M for the conveyor J to the forward or tail end of this conveyor.

While I have shown and described but a single embodiment of this invention, it is to be understood that it is capable of many modifications. Changes, therefore, in the construction and arrangement may be made which do not depart from the spirit and scope of the invention as disclosed in the appended claims in which it is my intention to claim all novelty inherent in the invention as broadly as possible in view of the prior art.

It is to be particularly noted that the extension B' of the boom B is bent upwardly; and that the motor 17 and gearing which operate the conveyor G are mounted on top of this extension. The extension B' being bent upwardly permits the forward end of the boom B to be elevated a great distance before the extension B' engages the deck of the ship.

I claim:

1. In unloading mechanism for ships and the like; a turn table; a boom carried by said turn table and secured thereto by a horizontal pivot; and a rearwardly projecting extension on said boom, said extension being inclined upwardly.

2. In unloading mechanism for ships and the like; a turn table; a boom carried by said table and secured thereto by a horizontal pivot; and a rearwardly projecting extension on said boom extending beyond the periphery of the turn table and inclined upwardly.

3. In unloading mechanism for ships and the like; a turn table; a boom carried by said table and secured thereto by a horizontal pivot; a belt conveyor on said boom; a rearwardly projecting upwardly inclined extension on said boom; and driving mechanism for the conveyor carried on said extension.

4. Mechanism as claimed in claim 3 in which the boom extension projects beyond the periphery of the turn table.

In testimony whereof, I have hereunto set my hand and seal this 15th day of July, 1927.

JACOB R. SENSIBAR.